Patented June 11, 1940

2,203,704

UNITED STATES PATENT OFFICE 2,203,704

CHEMICAL METHOD OF ETHERIFYING DEXTRAN

Grant L. Stahly and Warner W. Carlson, Columbus, Ohio, assignors to Commonwealth Engineering Corporation, Wilmington, Del., a corporation of Delaware No Drawing. Original application July 29, 1937, Serial No. 156,426. Divided and this application February 4, 1938, Serial No. 188,723

7 Claims. (Cl. 260—209)

This invention relates to the production of polysaccharide materials by the action of various micro-organisms on suitable culture media, and to processes for converting these polysaccharides into their ether, mixed ether, ester, mixed ester or mixed ether-ester derivatives.

It is the object of this invention to produce polysaccharide materials by the action of various micro-organisms on suitable culture media and in particular to produce dextran; and to thereafter subject the polysaccharide materials such as dextran to a process of etherification or esterification either while the materials are in the culture media or after separation therefrom so as to produce the new products of resinous character such as the benzyl ether of dextran, the butyl ether of dextran, etc.

The polysaccharides are produced by inoculating media containing sucrose, nitrogenous compounds and various salts with bacteria of known genus and species. These bacteria may be placed in one of two groupings, those that produce polysaccharides known as levans, or those that produce the polysaccharides known as dextrans. The two types of polysaccharides are distinguished from one another by the fact that on hydrolysis with acids or enzymes, the dextrans yield only dextrose while the levans yield only levulose. As specific examples, Bacillus mesentericus, B. subtilis, B. megatherium, Pseudomonas pruni, Ps. prunicola or Ps. phaseoli may be employed for the production of the levan type of polysaccharide, while Leuconostoc mesenteroides or L. dextranicum may be used for the production of the dextran type.

The culture media employed must contain some sucrose; this can be either refined or crude sucrose, molasses or any similar sucrose containing material. Nitrogen may be added in the form of commercial peptone, beef extract or other nitrogen containing material. If molasses is used as the sucrose source, nitrogenous compounds in sufficient quantity are present in it so that none need be added. Salts such as dipotassium phosphate and sodium chloride are also added. As a specific example, a typical medium may contain: sucrose, 5–10% peptone, 0.1%, dipotassium phosphate 0.2% and sodium chloride 0.1%. The pH of the medium preferably is adjusted to slightly on the alkaline side of neutrality.

The production of the polysaccharide is favored by keeping the reaction of the media slightly alkaline throughout the period of fermentation. This may be accomplished by the periodic addition of alkali to the fermenting media or by using an excess of calcium carbonate in the media. After inoculation the cultures are incubated at the temperature most favorable to the growth of the micro-organism being used. For one of the preferred forms, Leuconostoc mesenteroides, this temperature is around 25 degrees C. The progress of the fermentation may be followed by periodically removing samples of the fermenting culture media and precipitating the polysaccharide contained in them by the addition of three to five times their volume of alcohol. The precipitated polysaccharide may then be weighed. When a maximum of polysaccharide has been formed the culture media are ready for the etherification or esterification processes. The length of time necessary for the maximum of polysaccharide to be formed will vary with the organism employed, the temperature of incubation, the concentration of sucrose and other factors.

The polysaccharide may be isolated from the solution by precipitation with alcohol or acetone. Preferably the reaction of the fermented medium is first adjusted to the neutral point to lessen the possibility of hydrolysis of the polysaccharide, and the solution then concentrated under reduced pressure at a temperature of 40 to 50 degrees C. to approximately one-fourth its original volume. The solution is then poured, with stirring, into three to five times its volume of alcohol or acetone. The polysaccharide may be precipitated directly from the fermented culture media by the addition of alcohol or acetone, but it is then necessary to use a considerably larger amount of the precipitating agent.

For the preparation of the ether and ester derivatives of these polysaccharides it is not necessary that they first be isolated from the culture media in which they were formed. Instead the necessary reagents may be added directly to the fermented media, and after completion of the reaction, the ether, ester, or mixed ether-ester derivatives can be recovered from the mixture, either by a simple mechanical process in case the product is water insoluble, or by the use of specific precipitating agents.

If, however, the polysaccharide is not removed from the culture solution before esterification or etherification, the product obtained is a mixture of compounds. It will contain, besides the ethers and/or esters of the polysaccharide, the corresponding derivatives of any excess sucrose or metabolic products remaining in the fermented culture media. In some cases this may be desirable since a blending of these various derivatives yields a product with a range of solubilities. However, in cases in which a product with the specific properties of the polysaccharide derivative alone are desired, it is necessary either to separate the dextrans or levans from the culture media before chemical treatment, or else to remove the undesirable by-products, from the mixture obtained by the direct treatment of the fermented media, by the use of specific solvents.

Whether the fermented media are treated directly, or the polysaccharides first isolated by alcohol or acetone precipitation, the proportions of the reactants used in the preparation of the ether derivatives are approximately as follows: one mol of the polysaccharide, 3.5 mols of the alkyl or aralkyl halide and 4.5 mols of sodium hydroxide. If the polysaccharide was isolated from the medium before the chemical treatment, sufficient water must be added to the mixture so as to yield approximately a 10 per cent solution of the sodium hydroxide.

If the fermented culture medium itself is used, the amount of water present should be so regulated by concentration or dilution to again yield approximately a 10 per cent solution of the alkali. After addition of the reagents the mixture is heated for a predetermined time, usually 4 to 6 hours, at a temperature anywhere from 80 to 130 degrees C. This temperature depends on the derivative being prepared.

In general, the higher the temperature and the longer the period of heating the greater will be the number of hydroxyl groups in the polysaccharide which will be substituted by the organic radical of the halide compound used. The temperature and time of heating employed is consequently governed by the type of product desired. The organic halide used may be any member of the aliphatic series such as methyl chloride, ethyl chloride, propyl or isopropyl chloride, butyl chloride or any of its isomers, etc., or any one of the araliphatic series such as benzyl chloride.

The aliphatic derivatives are water soluble, at least as high as the butyl derivative. The benzyl ethers are generally water insoluble. Regardless of the type of organic halide used, increasing the proportion of halide to polysaccharide, running the reaction at a higher temperature and for a longer period of time will generally result in a decreased water solubility for the products obtained.

It is to be understood that the organic halide used may be either the chloride, bromide or iodide derivative. For purposes of economy, the chlorides are generally employed.

At the conclusion of the reaction period excess halide is recovered by any suitable process such as steam distillation. The product is isolated by mechanical means if it is water insoluble or by precipitation if it is water soluble.

The process may be varied by the simultaneous introduction of two or more organic halide compounds into the reaction mixture, in which case the product will be a mixed ether; or a particular ether derivative may be prepared and the product from the reaction then treated with a different organic halide to yield a mixed ether derivative. Again, an ether derivative may be prepared and then further treated with organic acid chlorides, acid anhydrides and the like for the preparation of mixed ether-ester derivatives. Such variations in treatment are, of course, almost without number.

The products in general are to be described as plastic, amorphous masses, either water soluble or insoluble depending upon the reaction conditions and the particular halide employed. As an example, the benzyl ether of dextran is a water insoluble material which resists the action of the common organic solvents, while the butyl ether of dextran is water soluble.

The following are examples of specific practices of our method for the production of new products. It will be understood we do not desire to be confined to the detailed proportions, temperatures and pressures, although we are reciting hereinafter those that we have found to be the preferred temperatures and other conditions.

It will be further understood that it is comprehended within this process the production of a large number of allied materials.

It will be further understood that we are illustrating the process and the materials that can be produced by typical materials within which we comprehend other similar new materials.

Example I

Benzyl ether derivatives

This process may be carried out directly on the fermented culture media containing the polysaccharide, such as dextran, although the same process can be employed with the extracted dextran after it has been removed from the culture media. This statement applies to the other examples hereinafter recited.

To a portion of the fermented culture medium in which the polysaccharide has been produced and in which there is approximately 30 gm. of the polysaccharide, is added 90 gm. of benzyl chloride and 40 gm. of sodium hydroxide. The resulting mixture is heated for approximately five hours. If the temperature is held at 80 to 85 degrees C., the crude product is light orange in color and soft and rubbery in consistency. When higher temperatures of from 100 to 105 degrees C. are employed, an orange-brown product is obtained of the same consistency but of greater resistance to solvents. The time of heating may range from 4 to 6 hours but 5 hours is the preferable time. By varying the temperature of this benzylation process, the solubilities in various solvents of the resulting products are varied. These products are substantially insoluble in water.

Example II

Butyl ether derivatives

To a portion of the fermented culture medium containing 30 gm. of dextran, we add 120 gm. of butyl chloride and 40 gm. of sodium hydroxide. The mixture is heated at 100 degrees C. for four hours. The derivative is an amorphous mass that is water soluble.

Example III

Mixed benzyl ether-butyl ether derivatives

To a water solution of the butyl ether derivative is added benzyl chloride and sodium hydroxide in the proportion of 30 gm. of the butyl ether; 90 gm. of benzyl chloride and 40 gm. of sodium hydroxide. The mixture is heated at 80 to 85 degrees C. for a period of five hours. After removal of excess benzyl chloride and benzyl alcohol by steam distillation, the resulting product is isolated as a rather firm and leathery amorphous mass.

EXAMPLE IV

Beta-hydroxy ethyl ether derivatives

To a volume of the fermented culture medium containing about 30 gm. of dextran was added 160 gm. of ethylene chlorhydrin and 40 gm. of sodium hydroxide, and the reaction mixture heated at 80 to 85 degrees C. for five hours. At the end of this time the solution had become almost black in color, but on acidification a considerable amount of gas was given off and the color changed to a light brown. Since the beta-hydroxy ethyl ether derivative is water soluble it was isolated by precipitation with acetone. The product was an amorphous, hygroscopic mass.

EXAMPLE V

Mixed beta-hydroxy ethyl ether-benzyl ether derivatives

To a water solution of the beta-hydroxy ethyl ether derivative was added benzyl chloride and sodium hydroxide in the proportion 30 gm. of the ether, 90 gm. of benzyl chloride and 40 gm. of alkali. The mixture was heated at 80 to 85 degrees C. for five hours. After removal of excess benzyl chloride and benzyl alcohol by steam distillation, the resulting product appeared as a golden-brown, rather moist and stringy amorphous mass.

The products recited herein are claimed in our co-pending application Ser. No. 156,427, filed July 29, 1937.

It will be understood that we desire to comprehend within this invention such modifications as come within the scope of our claims and our invention.

It will be understood that the temperatures and times are relative and may be varied within reasonable limits to secure the objectives desired.

This application is a division of our application Serial No. 156,426, filed July 29, 1937.

Having thus fully described our invention, what we claim as new and desire to secure by Letters Patent is:

1. In a process of making benzyl ethers of dextran, dissolving the dextran in a water solution of sufficient sodium hydroxide to keep the solution alkaline throughout the period of the reaction, adding benzyl chloride in the proportion of slightly more than one mol of the chloride for each hydroxyl group in the carbohydrate, and heating the mixture to form the benzyl ethers of dextran.

2. In a process of producing ethers of dextran, the step of forming an alkaline solution of dextran in water with sodium hydroxide to keep the solution alkaline throughout the reaction period, and the step of etherification with benzyl chloride.

3. In a method of producing ethers of dextran, the steps of (a) forming a water solution of dextran; (b) adding benzyl chloride and sodium hydroxide; and (c) heating the mixture for a sufficient period to react the dextran and benzyl chloride in an alkaline condition to produce benzyl ether of dextran.

4. In a process of making ethers of dextran, dissolving the dextran in an alkaline water solution and maintaining the alkaline character of the solution throughout the period of the reaction, benzylating the solution, and heating the mixture to form an ether of dextran.

5. In a process of making ethers of dextran, dissolving the dextran in an alkaline water solution and maintaining the alkaline character of the solution throughout the period of the reaction, benzylating the solution and heating the mixture to form an ether of dextran, and purifying the product by distilling off the excess benzylation reactants.

6. In a method of producing benzyl ether of dextran, reacting approximately 30 gm. of dextran in water with approximately 90 gm. of benzyl chloride and approximately 40 gm. of sodium hydroxide at temperatures ranging from 80 to 105 degrees C. for a period of from 4 to 6 hours.

7. In a process of making ethers of dextran, dissolving the dextran in an alkaline solution and maintaining the alkaline character of the solution throughout the period of the reaction, subjecting the solution to an aralkyl etherifying agent, and heating the mixture to form an ether of dextran.

GRANT L. STAHLY.
WARNER W. CARLSON.